M. LANE.
Process for Ripening Fruits.
No. 208,744. Patented Oct. 8, 1878.
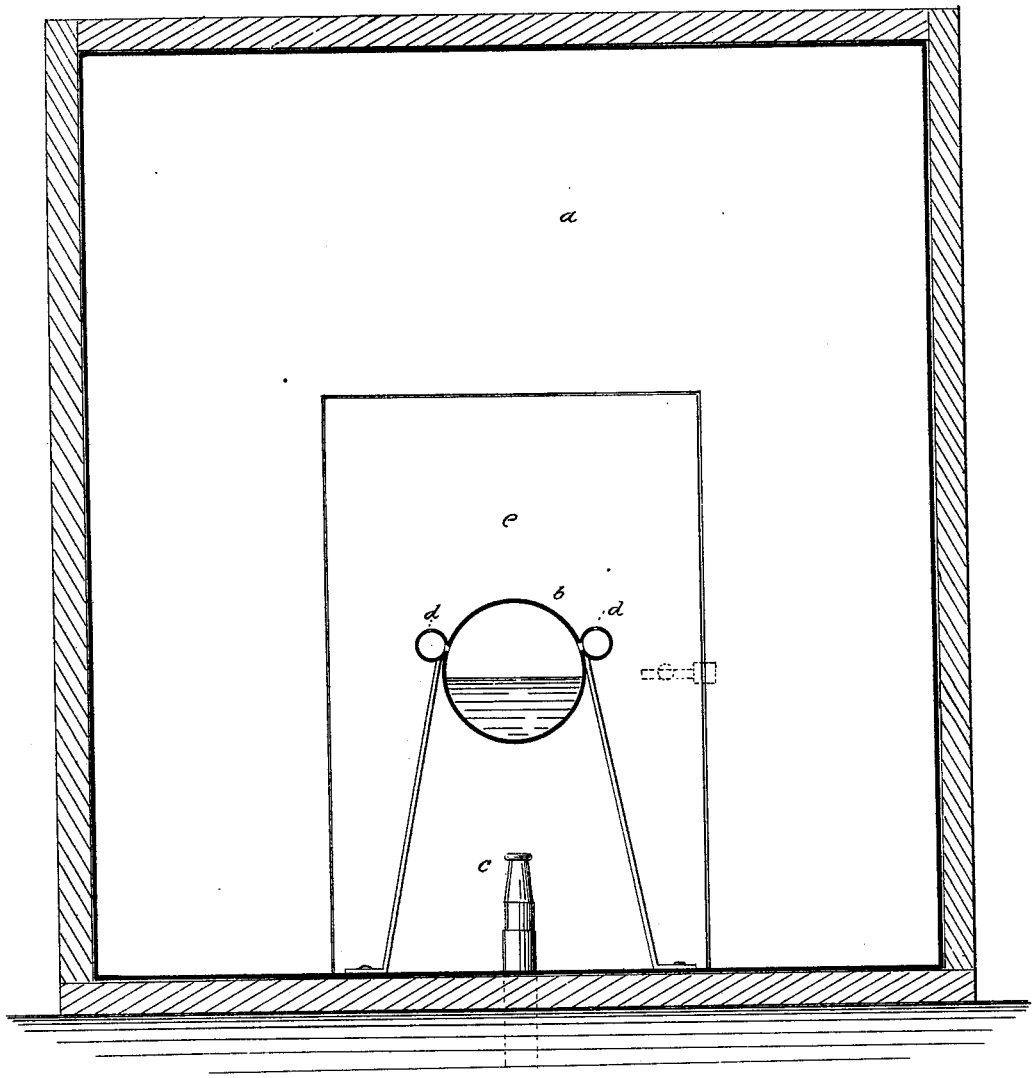
WITNESSES:
INVENTOR:
M. Lane
BY Munn & Co
ATTORNEYS.

UNITED STATES PATENT OFFICE.

MATTHEW LANE, OF NEW YORK, N. Y.

IMPROVEMENT IN PROCESSES FOR RIPENING FRUITS.

Specification forming part of Letters Patent No. 208,744, dated October 8, 1878; application filed July 11, 1878.

*To all whom it may concern:*

Be it known that I, MATTHEW LANE, of the city, county, and State of New York, have invented a new and Improved Process for Treating Unripe Fruit, of which the following is a specification:

It is well known that oranges and lemons for shipment to distant markets are gathered green or unripe, and that by the ordinary course of treatment they ripen slowly, unequally, and are likely to depreciate very much in quality and value. I have discovered that by subjecting such fruit to moist heated air, such as may be obtained by the use of steam, in a close chamber or receptacle, the ripening of the fruit can be regulated and controlled, so that it will be uniform, thorough, and complete within one or two days.

In carrying out this treatment, the fruit is placed in a close compartment or chamber, which chamber is heated uniformly by steam at a temperature ranging from 88° to 125° Fahrenheit. This treatment is continued for a period of from twenty-four to forty-eight hours, according to the condition of the fruit.

I find it advantageous, when it is desired to ripen the fruit quickly, to combine the dry heat from gas-burners with the steam heat. The dry heat alone shrivels the fruit, while the steam heat, if too high, is apt to scald the fruit; but by the combination of the two the ripening is rapidly accomplished, and the steam is not so hot as to prevent the attendant entering the room to examine the fruit.

As a convenient way to accomplish the object named, I place the boilers within the close chamber and heat the water by gas-jets.

In the drawing I have shown a vertical section of a chamber or compartment wherein my process may be carried out.

*a* represents a compartment, preferably lined with metal. *b* is a boiler containing water, and *c* are the gas-jets for heating the water. The steam, as it is evolved, passes into the room through the openings *d*.

The steam might be generated outside of the compartment *a*, and injected into the same when at the desired pressure.

The compartment *a* is to be provided with a door, *e*, in which may be a window, and provision is to be made for admitting air enough to feed the gas-jets.

The oranges or lemons are placed in the compartment in their original boxes, and when ripened they retain their plumpness and are natural in color.

I do not claim, broadly, subjecting fruit to the action of humid and heated air, being well aware of the use of such process for the purpose of drying, maturing, and preserving fruit under a patent to Alden. My process is different in itself, and aims at a corresponding difference in effect. The main points of difference are, that I ripen green fruit whole, (chiefly lemons, oranges, &c.,) and do not desiccate sliced or pared fruit (more particularly apples and peaches) which are already ripe, or in such condition as to be deemed so. I place such whole and green fruit in a close chamber, in which no draft or current of air is produced, and by admission of steam maintain the temperature above 88° Fahrenheit, but below 125° Fahrenheit, for a period of twenty-four to forty-eight hours, whereas Alden frequently raises the temperature to 200°, and removes the sliced or pared ripened fruit from the treating-chamber in a comparatively short time.

Having thus described my process, I claim as new and desire to secure by Letters Patent—

The process herein described of ripening fruit, consisting in the following steps: first, placing the unripe fruit in a chamber or receptacle tightly closed; second, subjecting the fruit to the action of steam and maintaining a temperature of 88° to 125° Fahrenheit for a period varying from twenty-four to forty-eight hours, according to the condition of the fruit when placed in the chamber or receptacle, as set forth.

M. LANE.

Witnesses:
C. SEDGWICK,
GEO. D. WALKER.